United States Patent [19]

Wendel

[11] 4,132,074
[45] Jan. 2, 1979

[54] PAVING AND SOLAR ENERGY SYSTEM AND METHOD

[75] Inventor: Ion L. Wendel, St. Petersburg, Fla.

[73] Assignee: James L. Lowe, St. Petersburg, Fla.

[21] Appl. No.: 692,892

[22] Filed: Jun. 4, 1976

[51] Int. Cl.² ............................................. F03G 7/02
[52] U.S. Cl. ..................................... 60/641; 126/271; 237/1 A
[58] Field of Search ................ 126/270, 271, 271.2 A; 165/45; 237/1 A; 60/641

[56] References Cited

U.S. PATENT DOCUMENTS

| | | | |
|---|---|---|---|
| 230,323 | 7/1880 | Molera et al. | 60/641 |
| 966,070 | 8/1910 | Bailey | 126/270 X |
| 1,473,018 | 11/1923 | Danner | 126/271 |
| 1,785,651 | 12/1930 | Romagholi | 60/641 |
| 3,157,358 | 10/1964 | Birkemeier | 237/1 R |
| 3,192,133 | 6/1965 | Adamec | 202/234 |
| 3,299,881 | 1/1967 | Koch | 126/271 |
| 3,815,574 | 6/1974 | Gaydos | 126/271 |
| 3,910,490 | 10/1975 | Saypalia, Jr. | 126/271 X |
| 3,952,947 | 4/1976 | Saunders | 126/270 X |
| 3,991,742 | 11/1976 | Gerber | 126/271 |
| 3,995,429 | 12/1976 | Peters | 60/641 |
| 4,019,495 | 4/1977 | Frazier et al. | 126/271 |
| 4,037,652 | 7/1977 | Brugger | 165/45 |
| 4,051,833 | 10/1977 | Vandament | 126/270 |

*Primary Examiner*—Allen M. Ostrager
*Assistant Examiner*—Stephen F. Husar
*Attorney, Agent, or Firm*—William E. Mouzavires

[57] ABSTRACT

Paving and solar energy utilization systems and methods disclosed herein include a fluid carrying conduit embedded in paving such as in a roadway or roofing exposed to solar energy. Fluid circulated through the conduit is heated by the paving and cools the paving thereby prolonging its useful life and reducing heat transmission through the roofing to the interior of the building. Large amounts of useable energy may be provided by a solar collector forming part of and generally concealed within structures having other useful functions such as a roadway, roofing and so forth. Additionally, the fluid carrying conduit of such a collector may alternatively carry a heated fluid as is customary for snow and ice removal. Specific examples of solar systems and methods of this type include heating swimming pool water by use of a collector forming part of a parking lot and/or roofing paving, and generating electric power by use of a collector forming part of a highway roadway, for example.

5 Claims, 3 Drawing Figures

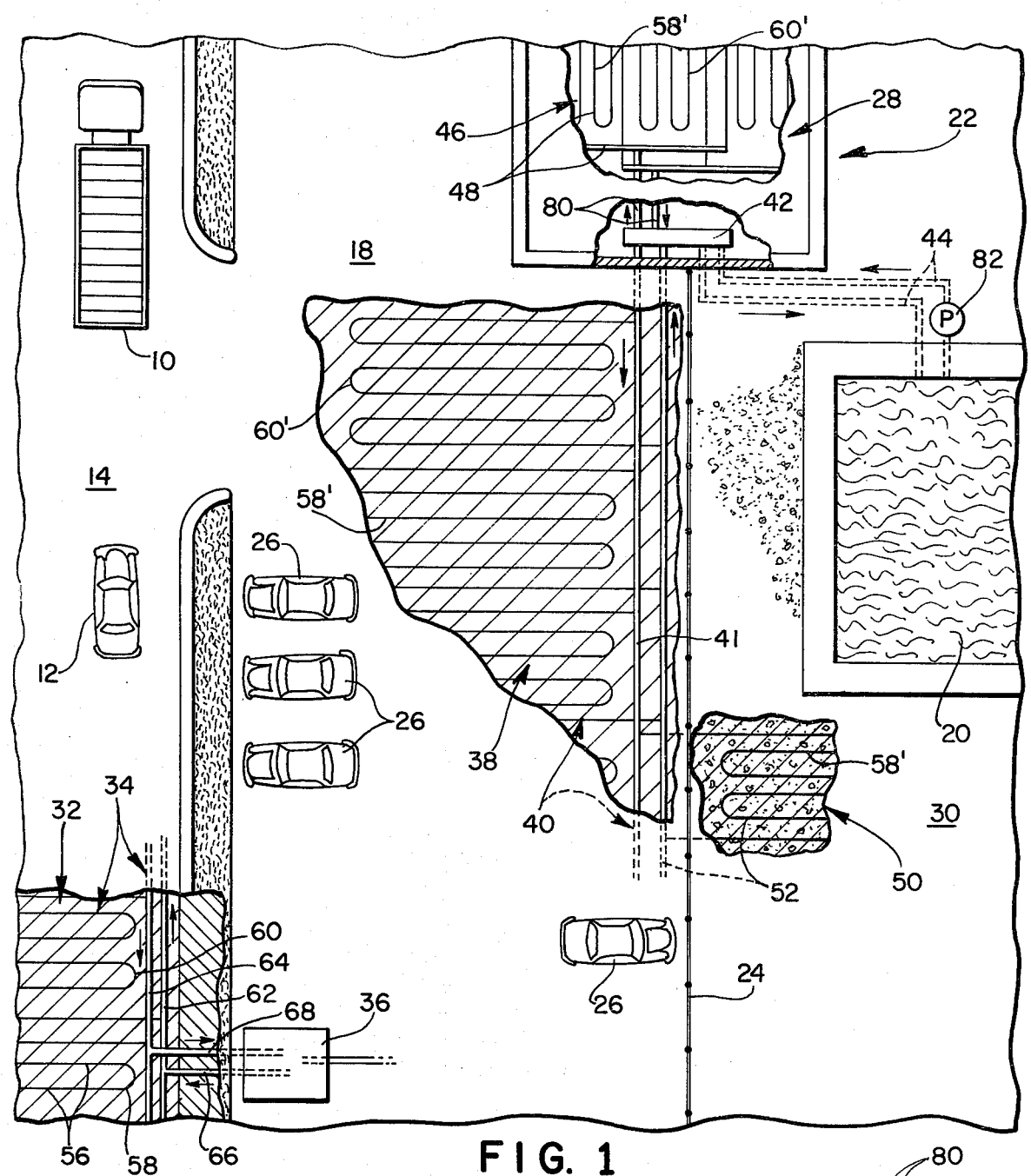
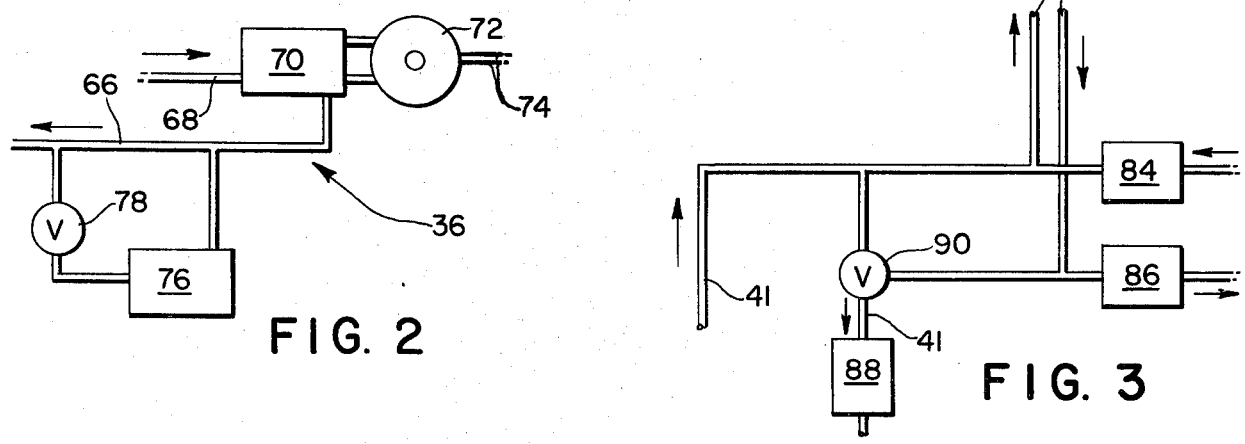
FIG. 1
FIG. 2
FIG. 3

PAVING AND SOLAR ENERGY SYSTEM AND METHOD

This invention relates to paving and solar collector systems and methods and, more particularly, to solar energy conversion utilizing roadways and roofing, and to cooling of such roadways and roofing.

BACKGROUND OF THE INVENTION

Common types of solar collectors are often in the form of an independent unit either mounted on a ground or roof support with a transparent cover overlying a heat pan carrying a generally serpentine conduit for water to be heated by the sun's rays, for example as shown in U.S. Pat. Nos. 3,910,490, and 1,338,644. In the first noted patent, FIG. 2 shows an "asphalt roof collector" and swimming pool water simply flows over the outer surface of the roof rather than through a fluid carrying conduit embedded in the asphalt. Another patent showing a roof collector in which water simply flows across the outer surface of the roof is U.S. Pat. No. 3,254,701. An interesting patent is U.S. Pat. No. 3,077,190, in which the outer or upper surface of what appears to be a path is in fact a glass plate 30 and this patent has nothing to do with paving or any form of a roadway. Another patent of interest, because of its FIG. 6, is U.S. Pat. No. 3,339,629, but is actually far removed from the subject matter of the present invention. Still another patent utilizing a roof for a solar generator is U.S. Pat. No. 3,087,309, in which a solar generator 3 includes a plurality of small solar generators 4 each utilizing a silicon strip and a layer of boron and sensitive to light for generating electricity.

Large areas of asphalt shown in U.S. Pat. Nos. 2,268,320, and 2,371,629, are heated by the sun for generating thermal currents to aid sail-planes in soaring, and the like. In the first of these patents FIG. 6 shows imbedded steam pipes for aiding in heating the asphalt and FIG. 7 shows electric heating thereof.

An ice skating rink with tubes carrying refrigerant is shown in FIG. 6 of U.S. Pat. No. 2,457,619. Use of embedded tubes in an ice rink installation is well known, another example being shown in U.S. Pat. No. 3,878,694, in which heat provided from a refrigerant is utilized to provide a "thermal equilibrium free of the danger of deep frost penetration", for a more structurally sound installation. While ice rink installations often have a refrigerant carrying embedded conduit in the ice supporting base of the rink and the refrigerant leaving the conduit in a relatively heated state, installations of this type are far removed from solar collectors and often have their ice supporting surface painted a light color, as white in outdoor rinks exposed to the sun's rays. Installations of this type are not concerned with prolonging the life of paving by reducing its temperature as the paving remains at a low temperature when cooling refrigerant is circulated thereto.

A solar collector having embedded conduits is shown in U.S. Pat. No. 3,815,574 the conduit being embedded in sand in a box with a black top layer on the sand, and with a glass cover as in typical collectors. A "Solar Air Moving System" is shown in U.S. Pat. No. 3,436,908 in which an embedded air carrying tube is open at upper and lower ends and as the tube is heated by the sun's rays air moves upwardly through the tube to drive a fan generator unit.

Other U.S. Pat. Nos. which appear to be of substantially less interest are: 2,138,689; 2,257,524; 2,277,311; 2,529,154; 3,129,703; 3,377,462; 3,509,716; 3,680,449; 3,780,262; 3,893,443; and 3,908,631.

While it is common practice to construct a flat roof so that it may be flooded with water to aid in cooling a building; and as shown in some of the previously noted patents, water may flow over the surface of a pitched roof for heating the water and somewhat cooling the roof, but the concept of cooling roofing by passing a cooling fluid through conduits embedded in the roofing is apparently lacking in the prior art. Such embedded conduits have a further advantage in carrying a fluid for heating the roof and thereby removing accumulations of snow and ice. Embedded conduits further permit providing a more attractive outer surface on the roof without the continuous wearing away which would occur when water or some other fluid continuously flows across the outer surface of the roof.

It is of course common practice to run cooling water across a roadway such as a patio, or a concrete seating area of an amphitheater, but this practice increases the humidity and often results in objectionable puddles.

In surface cooling of both roofing and roadways by flowing water there across, the heat taken up by the flowing water is usually unwanted and wasted, although one of the previously noted patents, U.S. Pat. No. 3,910,490, does show utilizing the heated water for a useful purpose, but as suggested in this patent the surface of the roof would be unique if not unsightly.

BRIEF STATEMENT OF THE INVENTION

The invention, in brief, is directed to systems and methods of cooling paving exposed to solar energy and utilizing the solar energy to perform useful work. The paving such as on a roadway or roofing has a fluid carrying system embedded therein for circulation of a fluid to be heated by solar energy received by the pavement, the fluid carrying system and pavement together forming a solar collector which is concealed from view and requires no extra space. Vast quantities of otherwise wasted energy are converted to useful purposes by utilizing the heated fluid from the collector in driving electric generating equipment, or for heating a swimming pool, or any other suitable purpose. Such systems and methods may be incorporated into expressways and highways extending across the country, city streets, parking lots, airport runways and aprons, patio slabs, and the like, as well as into roofing, and numerous other structures which serve a useful purpose other than as a part of a solar collector. The roadway, roofing, or the like, is cooled as the fluid passing through the fluid carrying system is heated, thus prolonging the paving life, and similarly cooling the roofing to reduce transfer of heat to within the building. Additionally, the system and method facilitates the use of darker colored roofing and roadway surfaces which reduce glare over the traditional white surfaces used in areas of extreme heat or intense sunshine, since heat absorbed by the roadway or roofing is dissipated through removal with the circulating fluid. Such installations and systems have additional advantages in that the conduit system may be utilized for circulating preheated water to dissipate snow and ice during cold weather.

Most any type of paving may be used in forming the solar collector, and generally the higher the coefficient of heat transfer the more efficient the operation of the solar collector. Also, paving with a dark outer surface is generally considered better than a light colored outer surface. Concrete may be used as the paving but asphalt or blacktop is most commonly used, particularly when the collector is to be installed at the time of repaving a roadway or a roof. The fluid carrying means is most commonly in the form of tubes which may be of various materials, commonly copper tubing or iron or steel pipe, but under suitable circumstances may be of a plastic or even ceramic material. In the event of preformed concrete slabs, or the like, the tubing may be molded therein or removable cores may be provided prior to molding and removed when the slab has set so that the tubes are an integral part of the concrete slab.

In view of the vast network of expressways and highways, as well as streets, paved tennis courts, airport runways, and the like, vast quantities of electric power can be generated by converting such paving into solar collectors which provide a hot fluid for driving the generators. While major electric generating systems of this type would require a considerable expenditure of money to install, the expense would be far less than numerous proposed traffic operated generating systems and would be considerably less expensive than similar systems utilizing conventional solar collectors or other types of solar operated devices.

It is an object of this invention to provide a new and useful system and method in which existing structures having other useful purposes are basically substantially intact but serve as solar collectors.

Another object is provision of a new and useful system and method for providing vast sources of useful energy without substantially disrupting or degrading the environment.

A further object is provision of a new and useful system and method for providing a solar collector at relatively low cost particularly when considered in conjunction with other advantages and benefits of the system and method.

A still further object is provision of a new and useful system and method of reducing excessive temperature of paving as in a roadway or roofing and thereby prolonging the useful life of the paving by reducing its temperature and concurrently reducing heat transfer from roofing to the interior of a building structure. A related object is provision of a solar collector including the paving, solar energy heating the paving and the heat being dissipated from the paving as a useful source of energy. Another related object is provision of the dissipated heat used as a useful source of energy for heating, generation of electricity, and other useful purposes.

Another object is provision of a new and useful paving and solar energy utilization system in which a solar collector includes a paving heated by solar energy, with provision within the paving for carrying a fluid and provision for passing a fluid therethrough and responsive thereto the fluid removing heat from the paving and being heated thereby, and provision for receiving the heated fluid and responsive thereto performing useful work. Related objects include the paving in the form of a roadway or, alternatively, in the form of roofing. Another related object is provision of the paving with an outer surface exposed to solar energy and the fluid carried substantially and completely within the paving and the outer surface of the paving covering the fluid carrier. A further related object is provision wherein the heated fluid is utilized for heating swimming pool water and, more particularly, the system including a swimming pool, the paving is a parking lot, the fluid is carried in tubing embedded within the paving and covered by the outer surface thereof, and the fluid is swimming pool water and is recirculated through the tubing for heating the water, and alternatively, a still further related object includes a power generating system utilizing the heat from the fluid to generate electricity, the paving is a roadway and the fluid is carried in tubing embedded within the roadway inwardly of the outer surface thereof.

Still another object is provision of a new and useful method of utilizing solar energy to perform useful work and to cool a paving, the method including the steps of forming a solar collector utilizing a paving exposed to solar energy, passing through the paving a fluid at a temperature lower than that of the paving and cooling the paving while heating the fluid, and then utilizing the fluid to perform useful work. Alternate related objects include utilizing paving in the form of either a roadway or roofing. Another related object includes utilizing a pavement having an outer surface which is exposed to solar energy, passing the fluid substantially entirely within said paving and inwardly of the outer surface thereof. Another related object is utilization of the heat for heating swimming pool water and, more particularly, utilizing a paving in the form of a parking lot having an outer surface exposed to solar energy, passing the fluid through tubing embedded substantially within the paving inwardly of the outer surface thereof, and passing water from a swimming pool proximate the parking lot through the tubing and returning the heated swimming pool water to the pool. A still further related object includes utilizing the heat of the heated fluid to generate useable power and, more particularly, to generate electric power.

A further object is provision of a new and useful solar energy utilization system for performing useful work, the system comprising a solar collector including a paving having an outer surface exposed to solar energy and heated thereby and further including provision within the paving and covered by the outer surface thereof for carrying a fluid, with provision for passing a fluid therethrough and responsive thereto the fluid being heated, and provision for receiving the heated fluid and responsive thereto performing useful work. Alternative related objects include the paving in the form of a roadway or roofing.

A still further object is provision of a new and useful method of utilizing solar energy to perform useful work, the method including the steps of forming a solar collector utilizing a paving having an outer surface exposed to solar energy, passing substantially entirely within the paving and inwardly of the outer surface a fluid at a temperature lower than that of the paving to heat the fluid, and then utilizing a paving in the form of a roadway or roofing.

A more specific object is provision of a new and useful swimming pool installation including a swimming pool, a roadway proximate the pool and exposed to solar energy, provision within the roadway for carrying a fluid and provision for circulating therethrough a fluid which is heated responsive to the roadway being heated by solar energy, and provision for heating water in the swimming pool responsive to the fluid being heated. Related objects include: the roadway having an outer surface exposed to solar energy, the fluid being carried in tubing embedded within the paving inwardly of an outer surface of the paving which is exposed to solar energy; the roadway being a parking lot proximate the swimming pool; the parking lot having an outer layer of blacktop paving and the tubing being embedded in the paving; and provision for recirculating the swimming pool water through tubing to heat the water.

Another more specific object is provision of a new and useful method of heating water in a swimming pool associated with a roadway exposed to solar energy, the method including the steps of embedding fluid carrying tubing in the roadway, circulating a fluid through the tubing to heat the fluid responsive to solar energy heating the roadway, and utilizing the heated fluid to heat the swimming pool water. Related objects include: the roadway having an outer surface exposed to solar energy and the step of embedding the tubing includes embedding the tubing within the roadway below the outer surface thereof; and in which the fluid is swimming pool water and the steps of circulating and utilizing the fluid together comprise recirculating the swimming pool water between the pool and the tubing.

Another more specific object is provision of a new and useful system, utilizing a paving, for generating useful power, the system comprising a solar collector including the paving and therein provision for carrying a fluid with provision for passing therethrough a fluid to be heated responsive to the paving being heated by solar energy, and provision for receiving the heated fluid and responsive thereto generating useful power. Related objects include: generating electric power; vaporize a liquid and utilizing the vaporized liquid to drive a turbo-generator; the fluid being carried by tubing embedded within the paving and in which the solar collector is a roadway having an outer face exposed to solar energy and the tubing being inward of said outer face.

Still another more specific object is provision of a new and useful method utilizing a paving for generating useful power and including the steps of forming the paving as a solar collector with provision for carrying a fluid within the paving and provision for passing a fluid therethrough and thereby heating the fluid responsive to the paving being heated, and utilizing the heated fluid to generate useful power. Related objects include: utilizing the heated fluid to generate electric power and, more particularly, utilizing the heated fluid to vaporize a liquid and utilizing the vaporized liquid to drive an electric generator such as a turbogenerator, for example; and the use of tubing carrying the fluid and forming the paving as a roadway having an outer surface exposed to solar energy and embedding the tubing in the paving inwardly of the outer surface thereof.

These and other objects and advantages of the invention will be apparent from the following description and the accompanying drawing.

BRIEF DESCRIPTION OF THE DRAWING

FIG. 1 is a schematic, fragmentary aerial view of a highway along a swimming pool installation including a parking lot and a locker building both with portions broken away and removed for clearer illustration;

FIG. 2 is a diagram of an electrical generating system shown in FIG. 1 adjacent the highway; and FIG. 3 is a diagram of part of a conditioning system shown in FIG. 1, for conditioning the swimming pool water.

DESCRIPTION OF THE ILLUSTRATED EMBODIMENT

Referring to FIG. 1 of the drawing, a truck 10 and automobile 12 are moving along a roadway in the form of a highway 14 and past an entrance 16 to another roadway or parking lot 18 at a swimming pool 20. A building 22 adjacent the pool 20 houses the pool office, locker rooms, and the like. A fence 24 separates the pool area from the parking lot on which are parked several automobiles, as 26.

The highway 14 and parking lot 18 may be of any suitable paving such as asphalt, blacktop, concrete, or the like, and similarly the building 22 which is shown as having a flat roof 28 may have any suitable form of roofing such as an asphalt or blacktop paving, for example. A roadway apron 30 of the pool 20 is usually provided with a concrete paving, as shown, but any other suitable form of apron surfacing may be provided.

Four solar collectors are shown in FIG. 1 and are incorporated into the various pavings, as follows: a solar collector 32 includes the paving of highway 14 and embedded therein a fluid carrying system 34 for utilizing solar energy to operate an electrical generating system 36 (FIG. 2); a solar collector 38 includes the paving of the parking lot 18 and a fluid carrying system 40 connected by mains 41 with a system 42 (FIG. 3) for conditioning the swimming pool water recirculated from the pool 20 to the system 42 through suitable piping 44; a solar collector 46 including a fluid carrying system 48 embedded in the paving of the building roof 28 and also connected with the conditioning system 42 for the swimming pool; and a solar collector 50 including a fluid carrying system 52 embedded in the concrete paving of the swimming pool apron 30 and connected with mains 41, which are common to the parking lot solar collector 38, to the conditioning system 42 for the swimming pool water.

The highway solar collector 32 which includes the fluid carrying system 34 is in the form of a serpentine type tubular field 56 embedded completely within the paving of the highway 14, the field being divided in sections as 58 and 60, each section having one end of its tubing connected with an inlet main 62 and the other end of its tubing connected with a return main 64, the inlet main 62 in turn being connected with outlet piping 66 from the electrical generating system 36 and the return main 64 being connected with inlet piping 68 to the electrical generating system.

With reference to FIG. 2, the electrical generating system 36 includes a boiler 70 receiving hot water through the inlet piping 68 from the solar collector 32, this hot water vaporizing a suitable liquid in the boiler 70 for driving a turbine of a turbo-generator 72, the generator delivering electricity to wires 74. The water from the boiler 70 returns to the solar collector 32 through outlet piping 66. If desired, an auxiliary water heater 76 may be provided in parallel with the outlet piping 66 and connected therewith through a valve 78 so that heated water may be circulated through the solar collector 32 for melting snow and ice from the highway 14.

The solar collectors 38, 46, and 50 are each connected with the system 42 for conditioning the water in the swimming pool 20. Each of these collectors is generally similar to the previously described highway collector 32, the fluid carrying systems of each being divided into sections as 58' and 60', for example. The fluid carrying systems 40 and 52 opening into the common inlet and outlet mains 41 to the conditioning system 42, and the fluid conduit system 48 opening into inlet and outlet mains 80 to the conditioning system 42. A pump 82 in the inlet main 44 to the conditioning system 42 is provided.

The conditioning system 42 shown in FIG. 3 includes a typical water filter 84 in the inlet one of the mains 44 from the swimming pool 20. From the filter 84 the water is circulated through the mains 54, and 80, to the solar collectors 38, 50 and 46, respectively. The heated water returning from the solar collectors through the appropriate ones of the mains 54 and 80 is preferably passed through an auxiliary heater 86 in the return one of the mains 44 to the swimming pool 20 to provide additional heat for the pool water if the solar collectors fail to provide sufficient heating of the swimming pool water. If desired, the parking lot solar collector 38 may be provided with heated water for melting snow and ice and, as shown, the mains 41 an auxiliary heater 88 and a valve 90 is provided so that the water may simply be recirculated through the collectors 38 and 50 without being circulated to the pool 20.

While this invention has been described and illustrated with reference to a particular embodiment entailing several variations in a particular environment, various changes may be apparent to one skilled in the art and the invention is therefore not to be limited to such embodiment or environment except as set forth in the appended claims.

What is claimed is:

1. A solar energy utilization system comprising in combination: a plurality of separate solar collectors each including a body having a surface exposed to solar energy and a plurality of liquid passages substantially entirely embedded within the body for conveying liquid for heat exchange with the body, a pool containing liquid to be heated, a closed conduit system including said passages and said pool, means for circulating liquid from the pool through said passages in said collectors and back to said pool, and an auxiliary liquid heating means for supplying heated liquid to said passages in said collectors independently of said pool, and wherein two of said solar collectors are connected in series with each other in said conduit system, and wherein there is included a third solar collector connected directly to said pool while bypassing said first two collectors.

2. The system defined in claim 1 wherein said conduit system includes inlet and outlet mains and wherein said liquid passages in at least one of said collectors are connected at different sections thereof to said inlet and outlet mains at a plurality of inlet points and a plurality of outlet points along said mains respectively.

3. The system defined in claim 1 wherein at least one of said collector bodies is a roadway paving and said liquid passages therein extend in serpentine fashion throughout a plane generally parallel to the roadway.

4. The system defined in claim 1 further including means for receiving heated liquid from said third collector including a power generating system for converting heat energy to electrical energy.

5. The system defined in claim 1 wherein one of said two collectors is a road paving in a parking lot and the other collector is a roof of a building located adjacent said pool.

* * * * *